No. 852,182. PATENTED APR. 30, 1907.
F. C. HOWE.
WEIGHING SCOOP.
APPLICATION FILED OCT. 5, 1906.
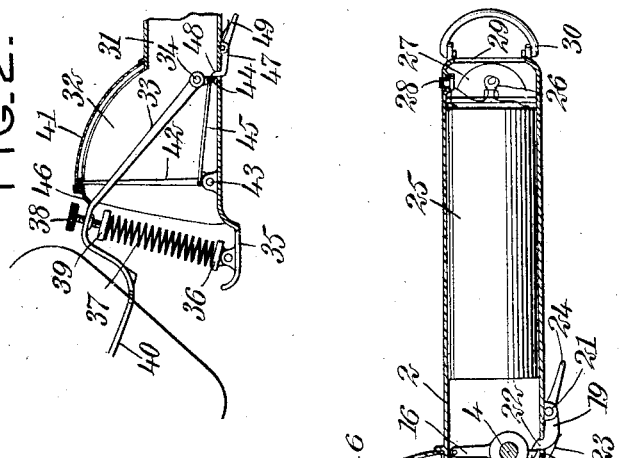
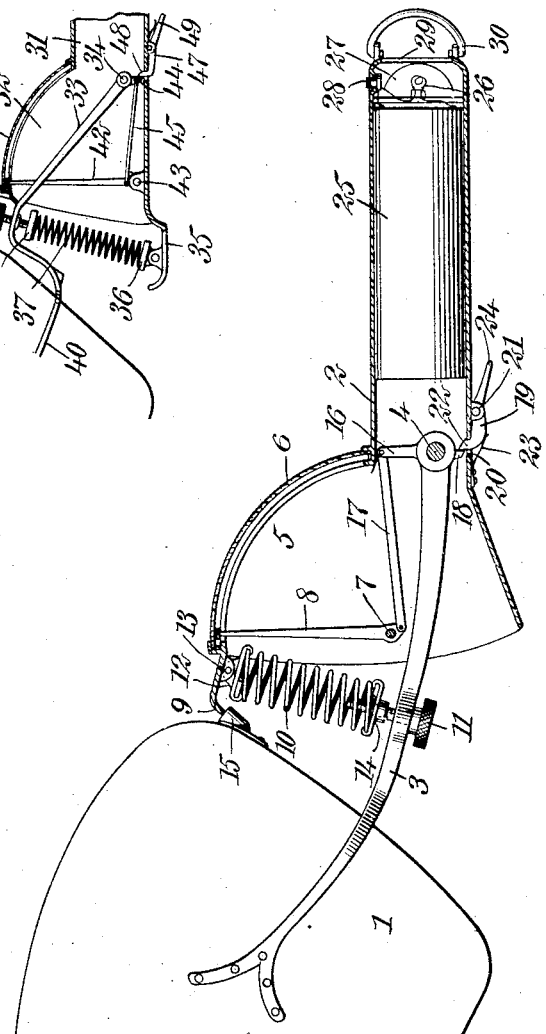
WITNESSES
INVENTOR
Frank C. Howe
BY
ATTORNEYS

UNITED STATES PATENT OFFICE.

FRANK C. HOWE, OF EL PASO, TEXAS.

WEIGHING-SCOOP.

No. 852,182.     Specification of Letters Patent.     Patented April 30, 1907.

Application filed October 5, 1906. Serial No. 337,559.

*To all whom it may concern:*

Be it known that I, FRANK C. HOWE, a citizen of the United States, and a resident of El Paso, in the county of El Paso and State of Texas, have invented a new and Improved Weighing-Scoop, of which the following is a full, clear, and exact description.

This invention relates to scoops, such as used in stores or similar places in selling food products such as flour, sugar, etc.

The general object of the invention is to produce a scoop which will operate to weigh the substance held therein, and the specific object of the invention is to provide a weighing mechanism in connection with the scoop which will give very accurate indications of the weight.

A further object of the invention is to provide the handle of the scoop with a light which may be lit at will so as to enable a persons using the scoop to illuminate the immediate surroundings of the scoop. This attachment increases the utility of the scoop where it is to be used in dark closets or under similar conditions.

The invention consists in the construction and combination of parts to be more fully described hereinafter and particularly set forth in the claims.

Reference is to be had to the accompanying drawings forming a part of this specification, in which similar characters of reference indicate corresponding parts in both figures.

Figure 1 is a side elevation of the scoop, the handle and weighing mechanism thereof being shown in cross section; and Fig. 2 is a view similar to Fig. 1, but showing only a portion of the scoop and its weighing mechanism, and representing a modified construction.

Referring more particularly to the parts, 1 represents the body or pan of the scoop; this pan is supported upon a tubular handle 2 by means of an arm 3 which is pivoted to the handle on a suitable pivot bolt or pin 4. While the principal portion of the handle 2 is tubular as shown, it will be seen that the inner extremity of the handle is formed into a hood 5 in which parts of the weighing mechanism are placed as indicated; and the upper side wall 6 of this hood is formed in an arc, the center of which lies in the axis of a pivot pin 7, which pivot pin affords means for attaching a pointer 8 within the hood. The end of this pointer 8 lies adjacent to the wall 6, and is visible through the wall 6 of the hood which, at this point, is formed of glass or similar transparent material. This curved wall 6 is formed with a scale which will give a reading in columns, to indicate the weight carried in the pan 1. At its upper portion the hood 5 is formed with a projecting stop 9, and near this point a spring 10, of helical form, is attached. The lower extremity of this spring is attached to an adjusting screw 11 which is mounted in the aforesaid arm 3 as indicated. The upper extremity of the spring 10 is not attached directly to the hood 5 but is attached to a head or pivot plate 12 which is pivoted at 13 to the hood as shown. A head 14 is attached to the other end of the spring, and through this head passes the threaded shank of the adjusting screw 11, as indicated. On the rear face of the pan 1 which lies adjacent to the hood a lug 15 is attached, which is normally held against the stop 9 by the tension of the spring 10, as will be readily understood. From this arrangement it should be understood that when a substance is placed in the pan, the arm 3 will be deflected downwardly and the spring 10 will be extended.

In order to move the pointer 8 proportionately with the degree of extension of the spring so that the scale on the wall 6 may indicate the weight within the pan, I provide the arm 3 with an upwardly projecting finger or short arm 16, which arm is disposed at the pivot 4, so that the arm 3, together with the arm 16, constitutes a bell crank lever. The pointer 8 is extended beyond its pivot pin 7 to enable a link 17 to be attached which connects the pointer with the extremity of the short arm 16 as shown. From this arrangement it should be understood that when the pan is moved downwardly by the weight, the finger or short arm 16 is moved in the direction of the pointer 8, and rotation of the pointer will take place from left to right. In the position shown in Fig. 1, the pointer occupies its zero position; that is, it will indicate that there is nothing in the pan.

I provide means for locking the arm 3 rigidly to the handle. For this purpose, the arm 3 is provided near the pivot bolt 4, with a downwardly projecting tooth 18, and this tooth is adapted to be engaged by a catch 19 which projects through a small opening 20 formed in the under side of the handle as indicated. This catch 19 is pivoted at 21 to the wall of the handle, and a portion of the catch which projects through the opening 20 constitutes a toe 22. The extremity of this toe presents an inclined rear face, while the extremity of the tooth 18 presents an inclined forward face. The toe is adapted to normally engage the tooth in the manner shown in Fig. 1, which, evidently, locks the arm 3 against a downward movement. The catch is normally held in this position by means of a leaf spring 23 attached to the wall of the handle as indicated. The rear portion of the catch is formed with an upwardly projecting tail 24 which is adapted to be pressed by one's fingers when it is desired to release the arm 3 from the catch.

It should be understood that when it is desired to weigh a substance in the pan, the weighing mechanism is released from the catch in the manner suggested. The tooth 18 will then move toward the right and pass over the toe 22. When the pan is emptied, the spring 10 will return it to its normal position, and in doing so, the inclined faces of the tooth 18 and toe 22 will slide over each other, so that the catch will operate automatically to lock the pan again to the handle.

I provide an arrangement whereby the handle may carry a light which may be lit at will so at to illuminate a dark corner or closet where the scoop may be in use. For this purpose, the interior of the tubular body 2 is provided with a dry cell 25, in the end of which a small incandescent light 26 is attached. This light is covered by a suitable globe 27, and a circuit through the light is adapted to be closed at will by a push button 28 which is preferably set into the material of the handle, as indicated. The end of the handle remote from the pan at which the light 26 is located, is formed with an opening 29 through which the rays of light from the lamp pass. This end of the handle is provided with a loop or bail 30, of wire, which enables the scoop to be hung up when not in use.

Instead of applying the weight to the spring in the manner described above, I may provide an arrangement in which a compression spring is employed. In this connection, referring especially to Fig. 2, the inner end of the handle 31 is provided with a hood 32, similar to the hood described above. To the lower portion of this hood near its point of connection with the handle 31, an arm 33 is pivotally attached by a pivot pin 34. The lower portion of the hood is extended so as to form a foot 35 to which a head 36 is pivoted. Upon this head rests a compression spring 37, of helical form, as shown. The upper extremity of the arm 33 carries an adjusting screw 38, the inner extremity of which is formed into a head 39, against which the upper extremity of the spring 37 thrusts as shown. Beyond the adjusting screw 38 the end of the arm 33 is offset downwardly and formed into a yoke 40 which is attached to the rear portion of the pan in any suitable manner. As in the preferred form, the upper portion of the hood 32 is formed into a scale 41, with which co-operates a pointer 42. This pointer is pivoted at 43 in the lower portion of the hood. The arm 33 is provided near its pivot pin 34 with a downwardly projecting tooth 44, and this tooth is connected pivotally by means of a link 45 with the pointer 42 at a point above the pivot 43 thereof. From this arrangement it should be understood that when a weight is in the pan, the arm 33 will be deflected downwardly and this will move the tooth 44 rearwardly, and the movement of the tooth will be communicated, by means of the link 45, to the pointer 42, so that the pointer will rotate from left to right on the scale at 41. The spring 37 normally holds the arm 33 against the upper edge of the hood at the point 46, so that this point of the hood operates as a stop to limit the upward movement of the arm. In order to enable the arm 33 to be locked rigidly to the handle, I provide a catch 47 which is very similar to the catch 19 described in connection with the preferred form. This catch is pivoted to the under side of the handle and is formed with a toe 48 which projects through the wall of the handle so as to engage the tooth 44.

A leaf spring 49 normally holds the toe 48 in engagement with the tooth, and by depressing the tail of the catch the toe may be thrown out of engagement therewith. The rear faces of the tooth and toe are inclined, as in the preferred form of the catch, so as to enable the catch to lock the pan automatically when it is returned by its spring after being emptied.

In both the forms described, the adjusting screws enable the condition of the spring to be accurately adjusted.

Having thus described my invention, I claim as new and desire to secure by Letters Patent:

1. In a weighing scoop, in combination, a handle having its inner extremity formed into a hood, an arm constituting a bell crank lever pivotally mounted in said handle, a pan carried by said arm, said arm having a short arm projecting therefrom, a spring connecting said first arm with said hood and adapted to support a weight in said pan, a pointer pivotally mounted within said hood and adapted to co-operate with a scale and connecting said arm with said pointer for actuating the same.

2. In a weighing scoop, in combination, a handle having a hood formed at the inner extremity thereof, an arm pivotally mounted in said handle, a pan carried by said arm, a spring connected with said arm and adapted to support a weight in said pan, said arm having a laterally projecting tooth near the pivot point thereof, a catch carried by said handle and co-operating with said tooth to lock said arm to said handle, and means for indicating the amount of a weight carried in said pan and actuated by said arm.

3. In a weighing scoop, in combination, a handle having its inner extremity formed into a hood, a bell crank lever pivoted to said hood and having a long arm, a pan attached to said long arm, said bell crank lever having a short arm, a spring attached to said bell crank lever and adapted to support a weight in said pan, a pointer adapted to co-operate with a scale, a connection from said pointer to said short arm, said bell crank lever having a laterally projecting tooth near the pivot point thereof, and a catch carried by said handle and co-operating with said tooth to lock said bell crank lever to said handle.

In testimony whereof I have signed my name to this specification in the presence of two subscribing witnesses.

FRANK C. HOWE.

Witnesses:
    GEORGE B. CANTRALL,
    G. F. DODGE.